United States Patent [19]

Sawka et al.

[11] Patent Number: 5,405,675
[45] Date of Patent: Apr. 11, 1995

[54] EMBOSSED MULTILAYER FILM

[75] Inventors: Raymond M. Sawka, Woodbury, Minn.; Carl W. McMullen, Roberts, Wis.; Chia-Tie Ho, Woodbury, Minn.; Stefan Weigl, Neuss, Germany

[73] Assignee: Minnesota Mining and Manufacturing Company, St. Paul, Minn.

[21] Appl. No.: 990,791

[22] Filed: Dec. 10, 1992

[51] Int. Cl.⁶ .............................................. B32B 3/00
[52] U.S. Cl. .................................... 428/195; 428/200; 428/203; 428/343; 428/413; 428/423.1; 428/480; 428/500; 428/521; 428/522; 428/688
[58] Field of Search ................. 428/143, 46, 195, 204, 428/206, 207, 327, 402, 915, 916, 200, 203, 343, 413, 423.1, 480, 500, 521, 522, 688; 156/209, 231; 427/197; 283/91

[56] References Cited

U.S. PATENT DOCUMENTS

| | | | |
|---|---|---|---|
| 4,214,028 | 7/1980 | Shortway et al. | 428/159 |
| 4,219,376 | 8/1980 | Roman | 156/209 |
| 5,032,003 | 7/1991 | Antes | 350/162.18 |
| 5,037,680 | 8/1991 | Papendick et al. | 428/31 |
| 5,051,310 | 9/1991 | Horn et al. | 428/423.3 |
| 5,169,704 | 12/1992 | Faust et al. | 428/143 |
| 5,304,272 | 4/1994 | Rohrbacker et al. | 156/209 |

FOREIGN PATENT DOCUMENTS

| | | | |
|---|---|---|---|
| 0464921 | 8/1992 | European Pat. Off. | B41M 5/00 |
| 2337240 | 4/1975 | Germany . | |
| 2103136 | 4/1990 | Japan . | |
| 2214868 | 9/1989 | United Kingdom . | |

*Primary Examiner*—Patrick J. Ryan
*Assistant Examiner*—William A. Krynski
*Attorney, Agent, or Firm*—Gary L. Griswold; Walter N. Kirn; Steven E. Skolnick

[57] ABSTRACT

An embossed multilayer film comprises an embossed base layer and a conformable, substantially uniformly thick protective surface layer that overlies the base layer. In one embodiment, the embossed multilayer film can be re-embossed. In another embodiment, the surface layer is provided by a polyurethane-based material. The invention also relates to a method of providing such an embossed multilayer film.

33 Claims, 3 Drawing Sheets

EMBOSSED MULTILAYER FILM

BACKGROUND OF THE INVENTION

1. Field of the Invention

In general, this invention relates to an embossed multilayer film and, more particularly, to a film comprising an embossed base layer and an overlying, conformable, protective surface layer.

2. Description of the Related Art

On site application of paint directly to a surface to be decorated is a time-honored method for providing decorative and functional graphic designs. While this approach provides many desirable aesthetic and physical features including realistic appearance, color flexibility, and durability to abrasion, weather and chemical degradation, it suffers from many disadvantages. Such disadvantages include the need for relatively skilled labor, long application times, and potential contamination to adjacent areas and mechanical equipment.

As a result, various prefabricated graphics have been developed. A typical prefabricated graphic comprises a plastic base film having an adhesive on one surface and, optionally, a design or decoration on the opposite surface. The design or decoration may comprise one or more color layers that provide a mono- or polychromatic appearance. In other instances, the design may be an embossed pattern that imparts a pebbled, sandblasted, simulated leather or other desirable finish to the plastic film. Combinations of color and embossing may also be used.

Some plastic films conventionally used in graphic designs do not possess sufficiently inherent resistance to the effects of environmental weathering, chemical exposure or abrasion to permit use in outdoor settings without being supplemented by a protective surface layer. Unfortunately, however, the use of protective surface layers in combination with an underlying embossed plastic film has, heretofore, presented difficult problems, solutions to which have long been sought. For example, many protective surface layers comprise relatively rigid and brittle thermoset polymers that are not readily embossed or sufficiently flexible, certain acrylic based materials being particularly notable in this regard. In such constructions, it is not facile to apply the surface layer to the plastic base film and subsequently emboss the multilayer construction.

One possible solution is to apply the surface layer after the plastic base film has been embossed. However, if it is necessary to use heat during application of the surface layer, the embossed pattern may lose some of its sharpness and distinctiveness. In more severe cases, the underlying base film may soften or even melt causing a catastrophic deterioration of the embossed pattern.

While it may be possible to spray the surface layer material onto the embossed base film, this may result in a surface layer of uneven thickness. Depressed areas of the emboss tend to accumulate more surface layer material than elevated flat ridges. Angular transition surfaces between the ridges and the depressions may accumulate more or less surface layer material depending on their profile. A surface layer of variable thickness can detrimentally affect the ability of the underlying base film to resist weathering, chemical exposure and abrasion. Also, low gloss surface layers may display a noticeable variation in gloss if the surface layer is not uniformly thick. Finally, uneven surface layers tend to soften or blur the sharpness of the embossed pattern.

U.S. Pat. No. 4,214,028, "Resinous Polymer Sheet Materials Having Surface Decorative Effects and Methods of Making the Same," issued July 22, 1980 to H. A. Shortway et al. discloses sheet materials that comprise a substrate such as a fibrous backing sheet and/or a blown or unblown resinous sheet polymer. A design is printed on the substrate and portions of the printed design contain a polymerization initiator. The sheet material further includes a wear layer containing reactive polymerizable monomers dispersed or dissolved in a poly(vinyl chloride) resin. The sheet is embossed at a sufficiently elevated temperature to cause the reactive polymerizable monomers overlying the portions of the printed design that contain the polymerization initiator to polymerize and crosslink, this occurring primarily during the embossing process. Reportedly, if crosslinking of the polymerizable reactive monomer takes place too early in the over-all procedure, then the desired embossment may be difficult or even impossible to obtain. It is also stated that if crosslinking of the polymerizable reactive monomer takes place too late, then, perhaps, it may be too late for certain embossed areas of the wear layer to retain their embossment.

Poly(vinyl chloride) (PVC) is a widely used film in the graphics industry. It can be embossed, pigmented or have a color layer screen printed thereon. PVC films are often associated with the use of organic solvents or plasticizers. However, for various health and environmental reasons, it is desirable to reduce or eliminate the use of solvents and plasticizers as well as PVC itself.

Consequently, there is considerable need for a durable embossed graphic that is substantially free of PVC.

SUMMARY OF THE INVENTION

This invention relates to an embossed multilayer film comprising an embossed base layer and a conformable, substantially uniformly thick protective surface layer that overlies the base layer. In one embodiment, the film can be re-embossed such that the film exhibits a first embossed pattern (such as an overall background pattern) and a second embossed pattern (such as a subsequently applied legend or logo).

In another embodiment, the protective surface layer is a polyurethane-based material that can impart interior surface protection properties to the multilayer film or, for more demanding outdoor applications, weatherability and/or resistance to chemical exposure.

The base layer preferably has a softening temperature (as determined by thermomechanical analysis) of greater than 90° C., more preferably greater than 120° C. so that the embossed pattern is stable at a temperature of at least 80° C., preferably at least 90° C., and most preferably at least 120° C. The base layer may be provided by a wide variety of materials including polyolefins, alkyl acrylate modified polyolefins, acid based ionomers, thermoplastic olefins, ethylene/vinyl acetate copolymers, acrylonitrile-butadiene-sytrene terpolymer, ethylene-propolyene-diene-monomer terpolymer, as well as suitable blends and mixtures of any of the foregoing materials. Poly(vinyl chloride) may also be used but is less preferred due to various health and environmental reasons. Preferably, the base layer is provided by a rubber modified ethylene-propylene copolymer or an ionomer of either ethylene/acrylic acid copolymer or ethylene/methacrylic acid copolymer.

The protective surface layer may provide interior surface protection properties or, for more demanding exterior applications, may be weatherable and/or resistant to chemical exposure. In general, polyurethane-based materials are desirable. For example, for interior uses, the protective surface layer may comprise the reaction product of an aromatic diisocyanate and a polyether polyol. For exterior uses, the surface layer preferably comprises the reaction product of an aliphatic diisocyanate and either a polyester polyol, a polycarbonate polyol or a polyacrylic polyol. In some formulations the polyurethane-based material (for both interior and exterior uses) may be blended with a supplemental material such as an acrylic or an epoxy. Polyurethane-based surface layers according to the invention may be crosslinked or uncrosslinked and may be either solvent or aqueous borne. Also useful for exterior settings are protective surface layers that an 80%/20% blend of, respectively, poly(vinylidene fluoride) and poly(methylmethacrylate).

The embossed multilayer films of the invention may further comprise at least one color layer and/or at least one adhesive layer, the latter for bonding the embossed film to a surface.

The invention also relates to a method for providing such embossed multilayer films. The method comprises the steps of providing the base layer and applying a polymerized surface layer of substantially uniform thickness to the base layer. The base layer is then embossed while retaining a surface layer of substantially uniform thickness. The base layer is embossed at a temperature between the softening temperature and the decomposition temperature of the base layer but less than the softening temperature of the surface layer. In certain instances, the surface layer may not have a softening temperature, in which event the embossing temperature should be less than the decomposition temperature of the surface layer. Preferably, the base layer is embossed at a temperature of about 95° C. to 205° C.

BRIEF DESCRIPTION OF THE DRAWINGS

The invention will be more fully understood with reference to the following drawings in which.

DETAILED DESCRIPTION OF THE PREFERRED EMBODIMENTS

Figure 1:
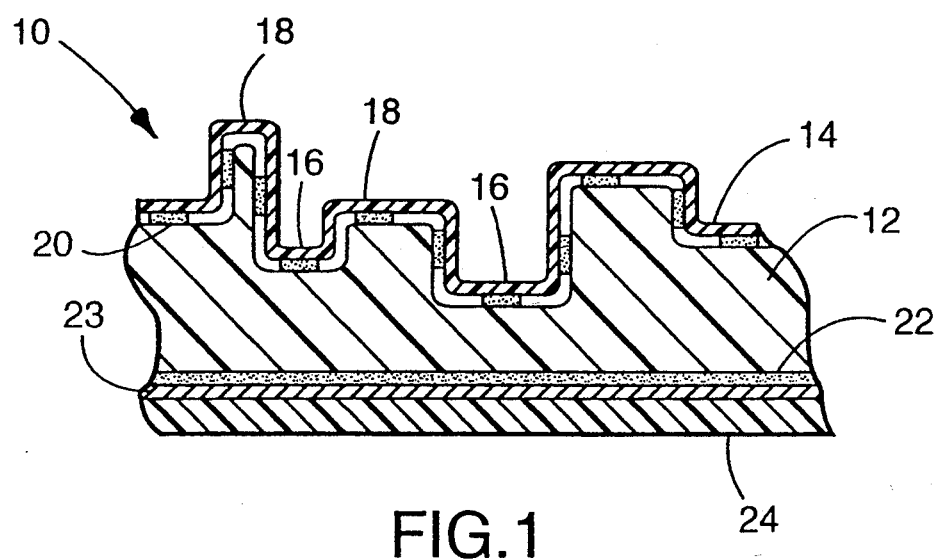
FIG. 1 is a cross-sectional view of an embossed multilayer film according to the invention.

Turning now to the drawings, FIG. 1 illustrates one embodiment of an embossed multilayer film 10 according to the invention. In a broad aspect of the invention, film 10 comprises an embossed base layer 12 and a substantially uniformly thick, conformable protective surface layer 14 that overlies the base layer.

By "embossed" it is meant that base layer 12 permanently retains an embossed pattern at temperatures equal to or above that to which film 10 may be exposed during use. Preferably, the embossed pattern remains stable at temperatures up to about 80° C., more preferably up to about 90° C., and most preferably up to about 120° C. An embossed pattern is considered stable within the scope of the present invention if, at a given temperature, there is no readily observable change in the depth or sharpness of the embossed pattern.

An embossed pattern refers to base layer 12 having an elevation or profile of varying height (i.e., depth). The depth of the embossed pattern preferably represents no more than about one-third of the total thickness of base layer 12. As a result, base layer 12 does not have a substantially uniform thickness once it has been embossed. Although the embossed pattern of FIG. 1 is shown as comprising a series of alternating depressions 16 and ridges 18, this is merely illustrative and the actual embossed pattern may have virtually any shape or design, including a pebbled, sandblasted, brushed, grained, simulated leather, parchment paper appearance, etc. Additionally, the embossed pattern may be a legend, logo, stylized representation, or any decorative or informational combination of alpha-numeric characters.

Advantageously, base layer 12 is re-embossable; that is, base layer 12 may be repeatedly softened, embossed and set during multiple sequential heating and cooling cycles. Consequently, base layer 12 may be provided with a first embossed pattern (for example, a pebbled appearance) over virtually its entire surface, followed by the application (such as by hot-stamping or the like) of a second embossed pattern, (for example, a particular design, logo or legend) which selectively replaces the pebbled pattern in the area of the hot-stamping. Even more generally, base layer 12 is re-embossable in the sense that the base layer may be heated to remove a previously applied embossed pattern so that it can be replaced with an alternative pattern.

Preferably, base layer 12 comprises materials that have a softening temperature which exceeds 90° C. more preferably a softening temperature which exceeds 120° C. The softening temperature for materials which are useful as base layer 12 may be determined by thermomechanical analysis. More specifically, a nitrogen-purged DuPont 943 thermomechanical analyzer (E. I. dupont de Nemours & Co.) fitted with a 5 gram loaded penetration probe and programmed to heat a sample of the base layer material at a rate of 15° C. per minute over the temperature range of −100° to 300° C. was used. Results are reported graphically as a plot of temperature (in °C.) vs. the dimensional change experienced by the sample (in microns).

Figure 2:
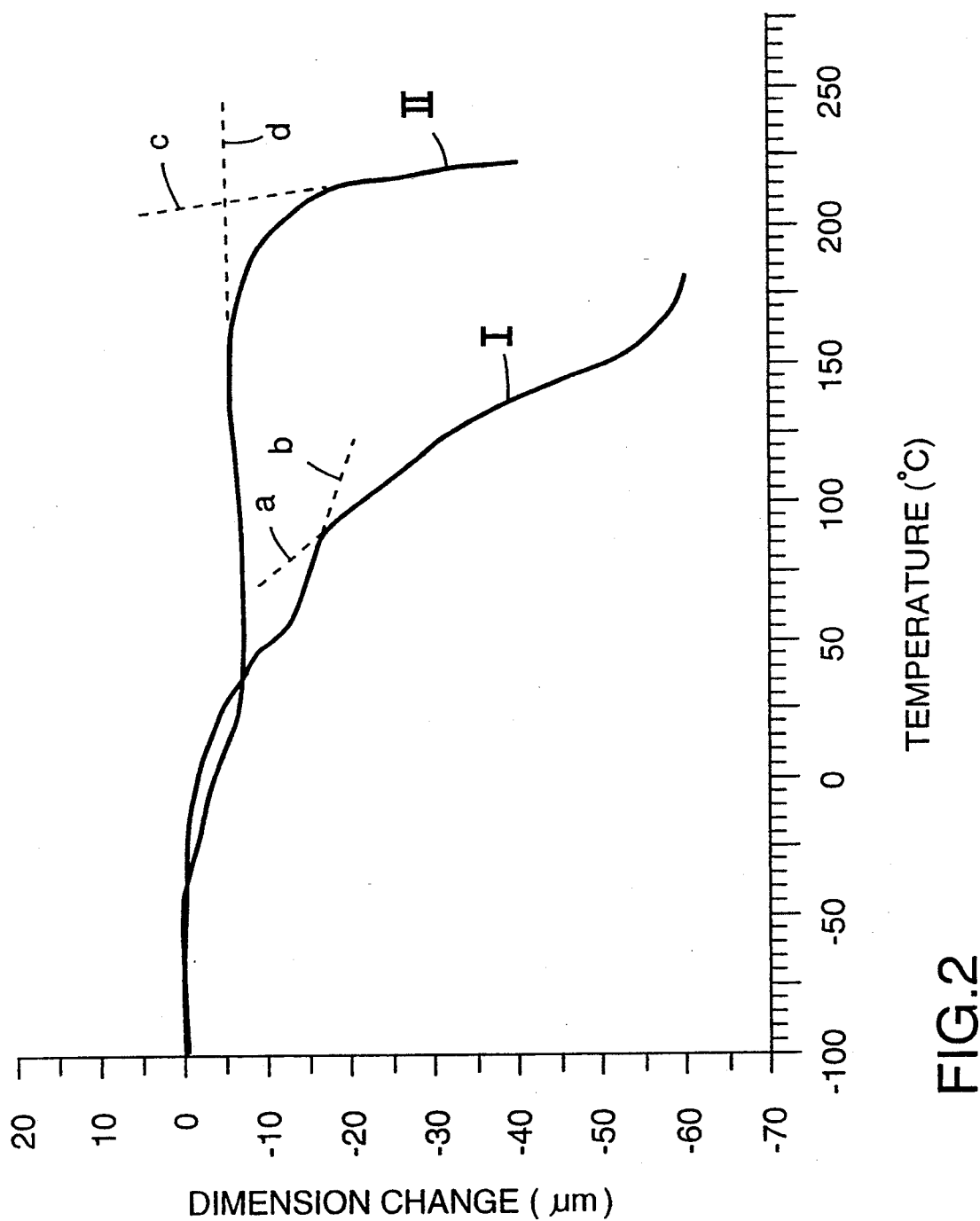
FIG. 2 is a graphical representation of the thermomechanical analysis of a base layer and a surface layer useful in an embossed multilayer film according to the invention.

A representative graph is shown in FIG. 2, the performance of the base layer material being identified by the "curve" labeled "I". The softening temperature of the base layer material is taken as the intersection of the two tangential extensions labeled, respectively, as "a" and "b". Thus, the base layer material identified by curve I has a softening temperature of about 90° to 95° C. The base layer material of curve I was Surlyn ™-1705 (E. I. dupont deNemours and Company) as used in example 2 below.

Suitable base layer materials comprise polyolefins, such as polyethylene, polypropylene and blends and copolymers thereof; alkyl acrylate modified polyolefins, such as ethylene methylacrylate and ethylene ethylacrylate; acid based ionomers, such as ethylene-acrylic acid copolymer and ethylene-methacrylic acid copolymer which have been combined with various metal cations (for example, zinc), as well as blends of these ionomers; thermoplastic olefins such as rubber modified ethylene-propylene copolymers; ethylene/vinyl acetate copolymers; acrylonitrile-butadiene-styrene;

ethylene-propylenediene monomer terpolymer; and suitable blends and mixtures of any of the foregoing materials. Poly(vinyl chloride) may also be used but is less preferred for various health and environmental reasons.

A particularly preferred base layer material comprises a thermoplastic olefin such as an ethylene-propylene copolymer having rubber particles dispersed therein, commercially available examples of which are the Novolen TM family of materials from BASF AG.

Base layer 12 may be cast, blown, extruded or calendared into a wide range of thicknesses, the particular thickness desired depending on the particular application intended for embossed multilayer film 10. For example, if film 10 is intended for motor vehicle applications, base layer thicknesses in the range of about 25 to 350 microns are useful.

Base layer 12 may be clear, opaque, translucent or pigmented to any color depending on the application and the desired visual effect. Conventional pigments, including those which are colored (including white and black), fluorescent, organic and inorganic may be used to provide a monochromatic or polychromatic appearance. Furthermore, a range of aesthetically pleasing visual effects is possible by varying the overall glossiness of base layer 12 from low gloss to high gloss. Optionally, base layer 12 may further comprise various antioxidants to retard or prevent polymer degradation during processing, heat stabilizers to prevent degradation of base: layer 12 at elevated temperatures, and ultraviolet radiation stabilizers to enhance the durability of film 10. Useful ultraviolet radiation stabilizers include hydroxybenzophenones, hydroxyphenylbenzotriazoles, alpha-cyanoacrylates, oxanalides, salicylates, and the like. Some pigments, most notably carbon black, may additionally provide ultraviolet radiation protection as well as imparting color to base layer 12. If carbon black is used in base layer 12, it is preferably included at a concentration of about 0.5 to 2.5 weight percent, based on the weight of base layer 12.

The stability of both base layer 12 and the embossed pattern at elevated temperatures may be enhanced by treating the base layer with electron beam radiation after embossing. It is believed that exposure to electron beam radiation induces a small amount of crosslinking in base layer 12 such that the softening temperature of the base layer material increases but not to a point that it no longer exhibits a readily definable softening temperature. In this manner, the embossed pattern is believed to be further set. Typical electron beam radiation exposures range from about 2 to 25 megarads. If, however, base layer 12 receives too much electron beam radiation, the base layer may become overly crosslinked with a consequential loss of flexibility and potential for re-embossability. Hence, base layer 12, even after radiation exposure, should ideally remain re-embossable though at a somewhat higher temperature than if the base film had not been irradiated.

Protective surface layer 14 overlies base layer 12 and may be adhered thereto, either directly or indirectly. By "indirectly" it is meant that other layers may be interposed between surface layer 14 and base layer 12. Importantly, surface layer 14 conforms to the embossed pattern carried by base layer 12 while maintaining a substantially uniform thickness. By "substantially uniform thickness" it is generally meant that there is no readily observable variation in the thickness of the surface layer when a photomicrograph of the full base layer/surface layer construction is viewed in cross-section by the unaided human eye at an enlargement of 62.5×. More specifically, the overall thickness of the surface layer does not vary by more than about 20%, preferably by no more than about 15%, assuming the use of quality manufacturing techniques intended to provide a surface layer of uniform thickness before embossing. In the most preferred embodiments, the dry thickness of surface layer 14 before and after embossing is substantially the same, based on the evaluative criteria described above. Preferably, the dry thickness of surface layer 14 does not exceed about 75 microns. More preferably it does not exceed about 50 microns, and most preferably the dry thickness of surface layer 14 is about 5 to 25 microns.

As explained more fully hereinbelow, the thickness of surface layer 14 remains substantially uniform after embossing because the surface layer does not significantly soften during embossing. As a result, surface layer 14, rather than becoming embossed, conforms to the embossed pattern which is imparted to base layer 12. By "conforms" (or "conformable"), it is meant that surface layer 14 repeats or replicates the embossed pattern carried by base layer 12 while maintaining a substantially uniform thickness, preferably a thickness substantially equal to its thickness before embossing, as noted above. While it will be appreciated that surface layer 14 necessarily must stretch somewhat during embossing, its thickness remains substantially uniform without experiencing local thinning or thickening on a macroscopic scale.

Surface layer 14 may be provided by a variety of polymeric materials, including those which display a softening temperature when measured by the thermomechanical analysis procedure described above. Such polymers are typically uncrosslinked or lightly crosslinked. Also useful are polymers which are not conventionally regarded as displaying a softening temperature by thermomechanical analysis. Most desirably, surface layer 14 comprises a polyurethane-based material.

Polyurethane-based surface layers comprise the reaction product of a polyisocyanate and an active hydrogen containing material. Aliphatic and aromatic polyisocyanates may be used although the former are preferred, especially if the embossed film is intended for exterior applications. Useful aromatic polyisocyanates include diphenylmethane-4, 4'-diisocyanate, toluene diisocyanate, p-tetramethylxylene diisocyanate, and naphthalene diisocyanate. Suitable aliphatic diisocyanates may be selected from isophorone diisocyanate, 1,6-hexamethylene diisocyanate, bis-(4-isocyanato cyclohexyl)methane, and 1,4-cyclohexyl diisocyanate.

Useful active hydrogen containing compounds include polyether polyols, and, for more demanding exterior applications, polyester polyols, polycarbonate polyols and polyacrylic polyols, as well as blends of any of these materials. Of course, surface layer materials suitable for outdoor use may also be used for interior applications.

Two-part, solvent-based polyurethanes provide useful surface layers. Conventional solvent systems include those which use xylene, methyl isobutyl ketone, methyl ethyl ketone, glycol ethers such as propylene glycol monomethylether acetate and diethylene glycol ethylether acetate, as well as blends and mixtures of the foregoing materials.

However, aqueous-based polyurethane dispersions are preferred because they are more environmentally compatible than their solvent-based counterparts. Aqueous-based polyurethane dispersions may contain small amounts of organic cosolvents. It will be understood that the reactive system which provides the polyisocyanate/active hydrogen material "reaction product" for an aqueous polyurethane dispersion may include small amounts of short chain diols (e.g., 1,4-butane diol) and short chain diamines (e.g. ethylene diamine) as chain extenders for modifying the properties of the surface layer. Such components are encompassed by the reaction product concept.

Polyurethane-based surface layers having utility in the invention (whether for interior or exterior applications) include polyurethane/acrylic resin dispersion blends and polyurethane/aqueous epoxy blends. In these blends, the polyurethane component predominates and provides a continuous phase in which are dispersed islands or microdomains of the acrylic or epoxy component. The acrylic or epoxy component typically provides no more than about 25% to 30% of the blended surface layer.

Figure 3:
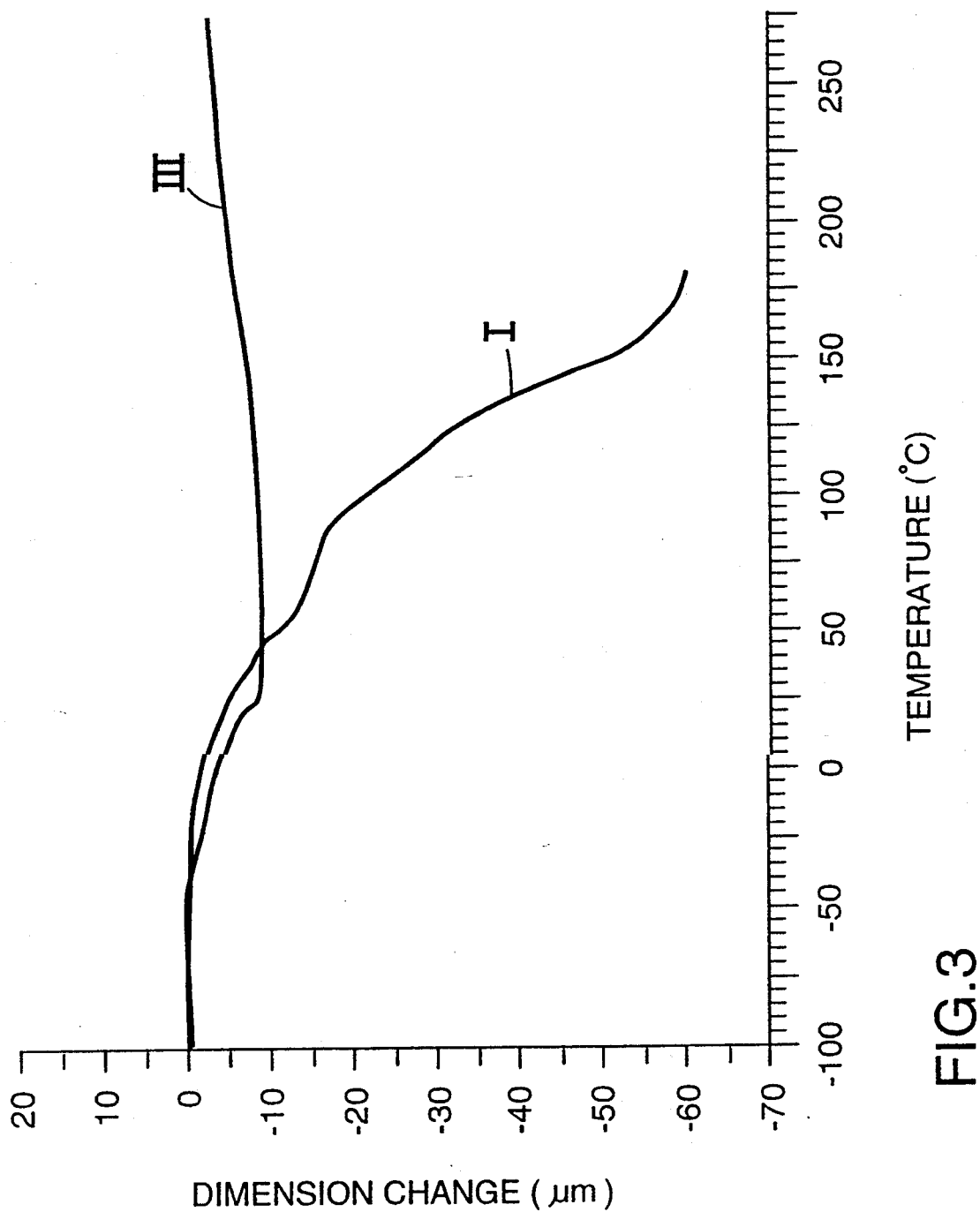
FIG. 3 is a graphical representation of the thermomechanical analysis of the base layer shown in FIG. 2 and a different surface layer also useful in an embossed multilayer film according to the invention.

The polyurethane surface layer may be uncrosslinked, lightly crosslinked or highly crosslinked. In general, as the degree of crosslinking increases, the softening temperature of the surface layer material correspondingly increases, eventually achieving a state where the material is not conventionally considered to have a softening temperature by thermomechanical analysis. The curve labeled "II" in FIG. 2 shows the thermomechanical analysis (using the procedure described above for the base layer materials) of the aqueous-based, lightly crosslinked polyurethane surface layer of example 3. This surface layer material has a softening temperature of about 205° C. based on the intersection of the tangential extensions labeled, respectively, "c" and "d". On the other hand, curve "III" in FIG. 3 illustrates the thermomechancial analysis of the highly crosslinked, two-part solvent-based polyurethane surface layer of example 1 which does not display a conventional softening temperature.

Another surface layer material useful for exterior applications is a blend of poly(vinylidene fluoride) (PVDF) and poly(methylmethacrylate) (PMMA) comprising 80% by weight PVDF and 20% by weight PMMA.

Preferably, surface layer 14 is transparent and optically clear so as to enhance the visibility of the underlying base layer as well as any decorative color layers which may be included, as discussed more fully hereinbelow. However, surface layer 14 may be pigmented in the manner described for base layer 12. Surface layer 14 may also incorporate various heat stabilizers, ultraviolet radiation stabilizers, antioxidants and the like, all as discussed above with regard to base layer 12. Surface layer 14 may further include various flow control agents and other processing aids to facilitate the coating of surface layer 14 on base layer 12, if such be the method of application. In some instances, a low gloss surface layer may be aesthetically desirable. In such constructions, a flattening agent such as a silica may be incorporated surface layer 14.

With continuing reference to FIG. 1, embossed multilayer film 10 may further and optionally comprise one or more color layers 20 and 22. Color layers 20 and 22 may be used singly, together or not at all. Furthermore, while color layers 20 and 22 are each illustrated as comprising a single layer, such layers may in fact comprise multiple layers each of which may be continuous or discontinuous thereby providing an almost limitless variety of aesthetically pleasing decorative effects. The color layers may be applied in virtually any pattern, shape or design including alpha-numeric characters.

Typically, each color layer comprises a color agent dispersed in a suitable vehicle or binder which may be solvent-based or, preferably for environmental, health, energy consumption and manufacturing reasons, aqueous-based. Useful color agents are widely varying and include organic and inorganic pigments, metallic flakes, pearlescent materials and dyes as well as combinations of these. In one particularly preferred embodiment, the color layer comprises an ink in which a pigment is dispersed in an aqueous binder.

Color layers 20 and 22 may be compositionally similar although this is not required. If a color layer is positioned between base layer 12 and surface layer 14 (such as color layer 20 in FIG. 1), it may need to be capable of being re-embossed in the same manner as base layer 12. Moreover, this color layer should retain a uniform color appearance subsequent to embossing. On the other hand, a color layer which is positioned base layer 12 and which is not embossed (such as color layer 22 in FIG. 1) may be more rigid.

Color layers 20 and 22 may vary in thickness over a wide range so long as the flexibility and conformability of film 10 to a surface is not materially adversely affected. Within these guidelines, the color layers may have a dry thickness in excess of about 75 microns although a dry thickness of about 5 to 30 microns is more preferred. Color layers 20 and 22 may be applied by many techniques including screen printing, direct coating, transfer lamination and the like.

Film 10 may also include a decorative layer 23 on base layer 12. Decorative layer 23 may be similar to color layers 20 and 22 or may comprise a thin metal (for example, aluminum) foil or a retroreflective material.

Again with reference to FIG. 1, embossed multilayer film 10 may further comprise an adhesive 24 for facilitating application of the film to a substrate (not shown separately in the drawing) such as the surface of a motor vehicle. Adhesive 24 may be provided by any of a wide variety of adhesives conventionally employed to bond graphic articles to a surface. Heat activated and pressure sensitive adhesives are particularly useful in this regard. Pressure sensitive adhesives based on acrylates, natural rubbers, styrene-isoprene-styrene block copolymers, and silicone-based adhesives such as polydimethylsiloxane and polymethlyphenlysiloxane may be used. Adhesives useful in the invention may incorporate additives such as ground glass, titanium dioxide, silica, glass beads, waxes, tackifiers, low molecular weight thermoplastics, oligomeric species, plasticizers, pigments, metallic flakes, metallic powders, etc. so long as they are provided in an amount that does not materially adversely effect the ability of the adhesive to bond film 10 to a surface. Typical adhesive thicknesses range from 25 to 50 microns. The adhesive may be repositionable.

Furthermore, although not shown separately in the drawings, embossed multilayer film 10 may further include one or more tie layers between otherwise adjacent layers of the construction. Tie layers may be incorporated to enhance adhesion between the otherwise adjacent layers in the event that there is insufficient adhesion therebetween. Tie layer materials may be coated onto previously formed or provided layers which comprise film 10 or may be coextruded therewith depending on the particular means of manufacturing the film. Suitable tie layer materials include maleic anhydrides grafted on polypropylenes, ethylene acrylic acid copolymers, polyurethanes, ethylene/vinyl alcohol copolymers, and melamine acrylics. Alternatively, adhesion between adjacent layers of film 10 may be promoted through various oxygenating treatments such as corona discharge and plasma exposure. In such instances, the further inclusion of tie layers may be unnecessary.

In a typical manufacturing process, base layer 12 of suitable materials and dimension is cast, blown, extruded or calendared. Tie layers may be provided on one or both major surfaces of base layer 12 if desired. Alternatively or in combination with the tie layers, oxygenating treatments may be applied to one or both surfaces of base layer 12. Subsequently, one or more continuous or discontinuous color layers may be provided on one or both major surfaces of base layer 12 depending on the decorative effects which are desired. The color layers may be applied by coating, screen printing, transfer lamination and other similar techniques. Other decorative layers may be added as desired. Adhesive 24 may then be applied to base layer 12 (or color layer 22 or decorative layer 23 if such be included) by coating, transfer lamination and the like. (Tie layers and/or oxygenating treatments may be utilized as needed.) Typically, the exposed surface of adhesive 24 is protected by a release liner (not shown separately in the drawings) such as a silicone-coated paper or polymer film. Protective surface layer 14 is coated, transfer laminated or otherwise applied to base layer 12 (or color layer 20 if such be included) using any suitable tie layers as necessary. The surface layer is polymerized before embossing. The order in which the various layers is assembled may be varied.

Following the application of protective surface layer 14, film 10 may be embossed to provide virtually any decorative pattern which is desired. Thermomechanical and high frequency embossing techniques may be used to impart, smooth, raised, recessed, matte, or glossy finishes in a virtually unlimited multitude of patterns such as a parchment paper like, brushed, sandblasted, simulated leather, pebbled, grained or lined looks. In addition, legends, logos and informational messages comprising any arrangement of alpha-numeric characters may be embossed into a base layer that has been previously provided with an overall embossed background pattern or which has not been previously embossed.

More specifically, multilayer film 10 is embossed at a temperature which reflects the individual thermomechanical and chemical properties of base layer 12 and surface layer 14. Thus, the embossing temperature should be greater than the softening temperature of the material which comprises base layer 12 (so as to provide the base layer with an acceptable embossed pattern) but less than the decomposition or degradation temperature of base layer 12 (so as to preserve the integrity of the material). Importantly, the embossing temperature should also be less than the softening temperature of the material which comprises surface layer 14 so as to permit the surface layer to conform to the pattern embossed in base layer 12 without undergoing any substantial change in thickness. As noted above, however, some surface layer materials useful in the invention do not display a softening temperature. For such materials, the embossing temperature should be less than the decomposition or degradation temperature.

Thus, as explained more fully hereinabove, surface layer 14, while repeating or replicating the embossed pattern carried by base layer 12, retains a substantially uniform thickness thereover and is itself not embossed. Since surface layer 14 has a substantially equal thickness, it uniformly protects underlying base layer 12 from abrasion, chemical exposure and environmental weathering.

Advantageously, base layer 12 can be reversibly softened. Consequently, after the performance of a first embossing step, film 10 may be re-embossed so as to provide, for example, a hot-stamped legend or logo on a portion of film 10, the subsequently applied legend or logo being surrounded by an overall embossed background pattern which was provided during the first embossing step. In a more extreme situation, the originally applied emboss could be removed by heating film 10 to the embossing temperature thereby causing base layer 12 to soften and release the embossed pattern.

While it will be understood that the particular embossing temperature depends substantially on the physical and chemical characteristics of the various layers which comprise film 10, it has been found that a temperature of about 160° C. is particularly useful. With reference to the base layer/surface layer combination shown in FIG. 2, the embossing temperature (i.e., the temperature at the surface of the film) should ideally be between about 95° C. and 205° C., more preferably between about 140° C. and 165° C. With reference to the base layer/surface layer combination shown in FIG. 3, the embossing temperature should be greater than 95° C. but less than the decomposition temperature of the base layer material.

In general, higher temperatures promote easier embossing. In this regard, the presence of surface layer 14 is particularly advantageous. Surface layer 14 protects underlying base layer 12 during embossing and permits the embossing to be carried out at a higher temperature than might otherwise be possible if base layer 12 was provided alone.

Once film 10 has been provided with the desired embossed pattern(s), further decorative features may be incorporated such as by securing a jewel like badge or emblem of the type shown in U.S. Pat. No. Re. 33,175 (Waugh) to surface layer 14. At this point, the film is ready for application to a substrate.

The substrate may be flat or have a compound, contoured surface in three dimensions. For application to these latter complex surfaces, film 10 needs to be sufficiently flexible to conform thereto without delaminating or lifting off. The actual requisite flexibility will depend in large part on the nature of the substrate surface. Some common surfaces encountered in the automotive industry include bumper facia, pillar posts, rocker panels, wheel covers, door panels, trunk and hood lids, mirror housings, dashboards, floormats, door sills, etc. Film 10 typically includes adhesive layer 24 which is conventionally protected by a removable release liner. Film 10 is applied to the substrate, preferably in a single continuous motion by simultaneously removing the release liner and applying film 10 in a smooth, flat manner. Film 10 may be squeegeed flat to remove any entrapped air and to provide a good adhesive bond with the underlying substrate.

Embossed films according to the invention may be applied to a wide variety of articles including automobiles, trucks, motorcycles, trains, airplanes, marine vehicles and snowmobiles. However, the film is not limited to vehicular settings and may be used anywhere an embossed decorative, functional or informational graphic article is desirable, including both indoor and outdoor environments.

For indoor uses, protective surface layer 4 may be formulated to impart interior surface protection properties to the multilayer film. As noted above, polyurethane-based materials comprising the reaction product of aromatic diisocyanates and polyether polyols are useful in this regard. "Interior surface protection properties" means mar resistance and that the film will not appreciably change in appearance or adhesion when subjected to interior cleaning solutions, food, cosmetics, grease, oil and plasticizers.

With the proper formulation of surface layer 14, film 10 is particularly suited for use in outdoor environments. Such articles are exposed to a wide variety of harsh, deteriorative conditions such as environmental weathering, chemicals and abrasion. Polyurethane-based surface layers which comprise the reaction product of aliphatic diisocyanates and either polyester polyols, polycarbonate polyols or polyacrylic polyols are useful in this regard because of their ability to provide weathering, chemical and abrasion resistance while remaining flexible.

Consequently, base layer materials which heretofore were largely excluded from exterior applications because of their limited resistance to environmental weathering, chemical exposure and abrasion may now be successfully used in such settings. Furthermore, previous exterior grade films were often limited to vertical applications (for example, pillar posts) because of the reduced weathering exposure faced by these surfaces. Such films may now be successfully used in horizontal applications such as hood and deck lids.

The following tests may be used to evaluate the utility of embossed multilayer films according to the invention in outdoor environments, especially in conjunction with motor vehicles. These tests are analogous to many which have been adopted or developed by major automobile manufacturers. However, a film which fails to pass every test may still be suitable for outdoor use depending on the requirements for a given application and the standards which have been established by a particular end user. Unless alternative criteria are noted below, an embossed multilayer film is considered to have passed a particular test if it shows no objectionable effects including surface deterioration, excessive shrinkage, delamination, edge lifting, gloss or color change, adhesion loss, and cracking or crazing. Necessarily the results of these tests are somewhat subjective but such tests have long been used in the automotive industry to characterize exterior durability and observations should be consistent with those standards which have come to be recognized.

In each test, the embossed multilayer film includes a pressure sensitive adhesive (typically about 25 to 51 $\mu$m thick) for bonding a sample of the embossed multilayer film to a test substrate. The nature of the test substrate (its material of construction, whether it is painted, primed, etc.) is typically specified by the end user of the multilayer film, although any test substrate specified by an automobile manufacturer may be used. Conventionally, the test substrates are about 30.5 cm$\times$10.2 cm in size with the sample of the embossed multilayer film being 8.9 cm$\times$8.9 cm, except. as noted below. Once the sample has been firmly applied to the test substrate, the resulting panel is preconditioned for 24 hours under ambient conditions (23° C.$\pm$2° C., 50%$\pm$ 5% relative humidity (R.H.)). All tests are performed under ambient conditions unless noted otherwise. Furthermore, all panels are subjected to a 24 hour ambient condition recovery period at the conclusion of the test and before recording observations.

The following tests are not listed in any particular order.

Heat Aging

Panels are exposed for 168 hours at 80°$\pm$2° C. in an air-circulating oven.

Dimensional Stability

A film sample may exhibit a shrinkage of no more than 1.0% (more preferably, a shrinkage of no more than 0.5%) in the longitudinal direction following exposure for 30 minutes at 120°$\pm$2° C. in a mechanical convection oven. The sample dimensions are measured prior to and after exposure with the initial sample having dimensions of 2.54 cm$\times$20 cm.

Moisture Resistance

A panel is exposed for 168 hours at 38°$\pm$2° C. and 99$\pm$1% R.H.

Thermal/Environmental Cycling

A panel is exposed to 2 consecutive cycles each cycle consisting of: (i) 72 hours at 80° C., (ii) 24 hours at 38° C. and 99%$\pm$1% R.H., (iii) 7 hours at $-$30° C., (iv) 17 hours at 38° C. and 99%$\pm$1% R.H., (v) 7 hours at 80° C., (vi) 24 hours at 38° C. and 99%$\pm$1% R.H., and (vii) 17 hours at $-$30° C.

Gravel Resistance

A panel, once having completed the thermal/environmental cycle described above, is tested in accordance with SAE J400, January, 1985 ("Test for Chip Resistance of Surface Coatings") and evaluated using the SAE J400 rating scale. There shall be no evidence of film cut-thru to the test substrate.

Impact Resistance

1. Ambient Conditions

A panel, once having completed the thermal/environmental cycle described above, and without additional preconditioning, is impacted at 2.7 Joules with a Gardner Impact Tester.

2. $-$30° C.

A panel is conditioned at $-$30° C. for 4 hours and then is impacted at 2.7 Joules with a Gardner Impact Tester.

Accelerated Weathering

Resistance to environmental weathering (i.e., whether an embossed multilayer film is "weatherable" as that term is used herein) may be measured in accordance with SAE J1960 June, 89 (G-26, Type BH) "Accelerated Exposure of Automotive Exterior Materials Using a Controlled Irradience Water Cooled Xenon Arc Apparatus" which provides for 2,000 hours of accelerated xenon exposure weathering. The test uses 2640 kiloJoules/square meter of energy exposure at 340 nm.

Abrasion Resistance

"Resistance to abrasion" (or "abrasion resistance") as those terms are used herein may be evaluated by subjecting the embossed multilayer film to a Teledyne Taber Abraset (Teledyne, Inc.) fitted with a CS-17 abrading wheel carrying a load of 500 grams per head in accordance with SAE J1847. Preferably, the film does not exhibit any wear-thru to the test substrate after 200 cycles.

An embossed multilayer film of the invention may be regarded as "resistant to chemical exposure" (i.e., as having "chemical resistance") as those terms are used herein if it passes the salt spray, fuel resistance, acid resistance, solvent resistance and wax/dewax resistance tests described below.

Salt Spray

Resistance to a harsh salt spray is determined by spraying a panel with a 5% salt solution at 35° C. for 168 hours.

Fuel Resistance

1. Immersion Test

A panel is submerged 10 times for 10 second durations with a 20 second evaporation period between submersions in both diesel fuel and unleaded gasoline.

2. Soft Abrasion Test

A panel (embossed film sample size 5.1 cm × 12.7 cm) is mounted in an American Association of Textile Chemists and Colorists (A.A.T.C.C.) crockmeter (see A.A.T.C.C. Test Method 8-1972) and exposed separately to both diesel fuel and unleaded gasoline. A cotton-based testing fabric (specified in the A.A.T.C.C. test) used to rub the film sample is soaked in the test fluid before beginning the evaluation. The test uses a total of 6 rub cycles and a 900 gram load.

Acid Resistance 3 drops of 0.1N HCl is placed on the sample, covered with a watch glass, and heated for 30 minutes at 38° C. in an air-circulating oven. The panel is allowed to cool and then rinsed. The panel is compared to an unacidified and unheated control panel.

Solvent Resistance

A sample of the embossed film (5.1 cm × 12.7 cm) is mounted in an A.A.T.C.C. crockmeter and exposed separately to each of the following fluids: (i) windshield washer solvent (isopropanol/water 1:1 volume:volume), (ii) antifreeze (e.g. ethylene glycol), (iii) car wash detergent (e.g., 1% Pril), (iv) oil (SAE 20), and (v) #2 diesel fuel. After a 60 second penetration period, the panel is rubbed for 25 cycles according to A.A.T.C.C. Test Method 8-1972, Wet Crocking Test.

Wax/Dewax Resistance

An automotive wax is applied to the sample which is then stored for 72 hours at ambient conditions. The wax is removed using a dewaxing agent and a sponge after allowing the dewaxing agent to penetrate the sample surface for approximately 5 to 10 minutes. The sample is then rinsed with warm deionized water and rubbed dry with a soft cloth.

The invention will be more fully appreciated with reference to the following nonlimiting examples in which all parts refer to parts by weight.

EXAMPLE 1

A surface layer derived from a two-part, solvent-based, crosslinked, polyurethane was prepared according to the formulation shown below in Table 1. 100 parts of the Table 1 formulation were subsequently mixed with 40 parts of an aliphatic diisocyanate (Desmodur TM N-75 from Miles) and 30 parts carbitol acetate. This surface layer formulation was then coated at a substantially uniform dry thickness of about 11 microns onto a 254 micron thick transparent base layer provided by an extruded Surlyn TM -1855 ethylene methacrylic acid copolymer ionomer resin (DuPont). The base layer included the manufacturer's recommended ultraviolet radiation stabilization package. A 51 micron thick acrylate pressure sensitive adhesive layer was coated onto a paper release liner and transfer laminated to the exposed surface of the base layer by passing the two between a pair of nip rollers. A release liner was added to protect the adhesive layer. Both major surfaces of the exposed base layer had been corona treated prior to the application of the surface layer and the adhesive layer with a net power of 325 Joules/second and a line speed of 10 centimeters/second. The film was high frequency embossed using a 6 kilowatt Thermatron press with a 95% power setting, a pressure of 70 pounds per square inch (psi), a 7 second forming time, and a 7 second cooling time. An approximately 254 micron thick, PVC-based, high frequency responsive, thermal transfer sheet was placed beneath the release liner to facilitate embossing. An unembossed sample of the film was then evaluated according to the tests described above with the results shown below in Table 5.

TABLE 1

| Component | Parts |
| --- | --- |
| Polyester polyol (available from Miles as Desmophen TM 670) | 47.5 |
| Acrylic polyol (Acryloid TM AU608S, available from Rohm & Haas) | 26.4 |
| Ultraviolet radiation absorber (Uvinul TM -N539 UVA (available from BASF AG) | 1.4 |
| Ultraviolet radiation stabilizer (Tinuvin TM 292 available from Ciba Geigy) | 0.9 |
| Fluorocarbon surfactant (FC TM -430, available from 3M Company). | 0.3 |
| Cellulose acetate butyrate (CAB TM 381-0.1, available from Eastman Chemicals) | 2.0 |
| Solvent (Carbitol acetate) | 19.7 |
| Flow modifier (Multiflow TM from Monsanto) | 1.8 |

EXAMPLE 2

A lightly crosslinked aqueous polyurethane/acrylic dispersion useful as a low gloss surface layer in the films of the invention was prepared according to the formulation shown below in Table 2. This formulation was coated at a substantially uniform dry thickness of 10 microns onto a 318 micron thick extruded Surlyn TM -1705 ethylene methacrylic acid copolymer ionomer resin (DuPont) base layer. The base layer was pigmented black by including 0.6 percent by weight carbon black in the ionomer resin. An ultraviolet radiation stabilizer package similar to that recommended by the base layer resin manufacturer and comprising a pair of ultraviolet radiation absorbers, a hindered amine light stabilizer, and an antioxidant was included. The exposed surface of the base layer was corona discharge treated to a total energy exposure of 0.5 Joules/square centimeter and a 25 micron thick acrylic pressure sensitive adhesive was laminated thereto using a pair of heated nip rolls.

TABLE 2

| Component | Parts |
| --- | --- |
| Aqueous polyurethane dispersion (Neorez TM XR-9679, available from ICI) | 57.6 |
| Aqueous acrylic emulsion (Neocryl TM A-601, available from ICI) | 16.6 |
| Ultraviolet radiation absorber (Uvinul TM N539 UVA) | 0.8 |
| Ultraviolet radiation stabilizer (Tinuvin TM 123, available from Ciba-Geigy) | 0.3 |
| Silica flattening agent (OK TM-412, available from Deguesa, AG) | 3.0 |
| Croselinking agent (Neocryl TM CX-100, available from ICI) | 0.9 |
| Solvent (Butyl carbitol) | 20.8 |

The multilayer film was thermomechanically embossed at a temperature of 155° C. and at a pressure of about 100 to 300 bars. The film was then evaluated for its utility in exterior applications according to the procedures described above and with the results shown below in Table 5. However, after exposure to natural weather conditions, the film displayed an undesirable white powdery material on its surface. The white powder could be readily brushed off.

EXAMPLE 3

Example 3 illustrates the preparation of an embossed multilayer film according to the invention and further comprising a color layer interposed between the base layer and the surface layer. The color layer was a blue pearlescent ink prepared according to the formulation shown below in Table 3. An unpigmented version of the base layer of example 2 was corona discharge treated to an exposure of 0.5 Joules/$cm^2$ and was provided with a 51 micron thick acrylate pressure sensitive adhesive that was laminated thereto. The color layer was coated at a substantially uniform dry thickness of about 25 microns onto the base layer surface not having adhesive. A lightly crosslinked aqueous polyurethane dispersion useful as a surface layer in the invention was prepared according to the formulation shown below in Table 4. The surface layer was coated onto the color layer at a substantially uniform dry thickness of about 16 microns.

The film of example 3 was then thermomechanically embossed at a temperature of 151° C. and at a pressure of 100 bars. The embossed film was then heated to a temperature of 135° C., which resulted in softening of the film and loss of the embossed pattern. The same film was then high frequency embossed using the conditions of example 1 thereby demonstrating that the embossed multilayer films of the invention are re-embossable. The re-embossable feature of the inventive films was also demonstrated by thermomechanically embossing the film of example 3 at a temperature of 151° C. and at a pressure of 100 bars to provide a first embossed pattern. The embossed film was then high frequency re-embossed as described above to provide the film with simultaneous first and second embossed patterns that were different.

The first thermomechanically embossed film was then tested for its exterior durability according to the tests described above and with the results shown below in Table 5.

TABLE 3

| Component | Parts |
| --- | --- |
| Aqueous pigment binder (Adcote TM-50T4983 from Morton International) | 65.3 |
| Crosslinking agent (Bacote TM-20 from Magnesium Elektron, Inc.) | 1.6 |
| Surfactant (Surfynol TM-104PA from Air Products) | 1.3 |
| Solvent (Butyl cellosolve) | 1.0 |
| Solvent (Butyl carbitol) | 0.5 |
| Texanol TM (a solvent available from Eastman Chemical) | 1.3 |
| Ultraviolet radiation stabilizer (Tinuvin TM-123) | 0.1 |
| Ultraviolet radiation absorber (Tinuvin TM-1130) (Ciba Geigy) | 0.3 |
| Defoamer (Byk TM-024 from BYK Chemie) | 0.6 |
| Blue pigment (Aqualour TM UB-17 blue from Penn Color) | 22.0 |
| Pearlescent material (Mearlin TM 139V from Mearl Co.) | 2.0 |
| Deionized water | 4.0 |

TABLE 4

| Component | Parts |
| --- | --- |
| Aqueous polyurethane dispersion (Neorez TM X-9679) | 81.0 |
| Ultraviolet radiation absorber (Uvinul TM N539 UVA) | 0.9 |
| Ultraviolet radiation stabilizer (Tinuvin TM 123) | 0.3 |
| Solvent (Butyl carbitol) | 8.4 |
| Flow agent (Triton TM GR-7M from Union Carbide) | 0.3 |
| Defoamer (Byk TM-025 from BYK Chemie) | 0.3 |
| Crosslinking agent (Neocryl TM CX-100) | 1.2 |
| Deionized water | 7.6 |

TABLE 5

| | Example | | |
| --- | --- | --- | --- |
| Test | 1 | 2 | 3 |
| Heat Aging | PASS | PASS | PASS |
| Dimensional Stability | PASS | PASS | NA |
| Moisture Resistance | PASS | PASS | PASS |
| Thermal/Environmental Cycling | PASS | PASS | PASS |
| Gravel Resistance | PASS | PASS | NA |
| Impact | | | |
| −30° C. | NT | PASS | NA |
| Ambient Conditions | NT | PASS | NA |
| Salt Spray | PASS | PASS | PASS |
| Fuel Resistance | PASS | PASS | PASS |
| Accelerated Weathering | NT | 600 Hours * | NA |
| Acid Resistance | PASS | PASS | NA |
| Solvent Resistance | NT | PASS | NA |
| Abrasion Resistance | NT | PASS | PASS |
| Wax/Dewax Resistance | NT | PASS | NA |

N.A. = Data not available
N.T. = Not tested
* = Data not available beyond approximately 600 hours of testing. After 600 hours of testing, the film had not failed.

EXAMPLE 4

The surface layer formulation of example 1 was coated at a substantially uniform dry thickness of about 35 microns onto a 350 micron thick black pigmented poly(vinyl chloride) base film commercially available from Beneke (Hanover, Germany) under their product designation 4835. A 35 micron thick acrylate pressure sensitive adhesive was heat laminated to the exposed surface of the base film. The film was high frequency embossed as described in example 1 but without the use of the PVC sheet.

EXAMPLE 5

A highly preferred embossed multilayer film according to the invention comprises the surface layer of example 4 coated onto a base layer comprising a Novolen ™ rubber modified ethlyene-propylene random block copolymer. The surface layer was coated at a substantially uniform dry thickness of about 20 microns onto a 300 micron thick base layer that had been pigmented black by including 2 percent by weight carbon black. A 35 micron thick acrylate pressure sensitive adhesive was laminated to the exposed surface of the base layer. The film of this example was hot stamp embossed, and a separate sample of the film was high frequency embossed.

Various modifications may be made within the foregoing specification and drawings without departing from the scope of the invention which is defined in the accompanying claims.

The embodiments for which an exclusive property or privilege is claimed are defined as follows:

1. An embossed multilayer film comprising:
   (a) an embossed base layer provided by a material selected from the group consisting of polyolefins, alkyl acrylate modified polyolefins, acid based ionomers, thermoplastic olefins, ethylene/vinyl acetate copolymers, acrylonitrile-butadiene-styrene terpolymer, ethylene-propylene-diene monomer terpolymer, and suitable blends and mixtures of any of the foregoing; and
   (b) a conformable, protective surface layer that has a substantially uniform thickness that does not vary by more than about 20% and which overlies the base layer;
   wherein, the base layer can be either thermomechanically or high frequency re-embossed.

2. An embossed multilayer film according to claim 1 wherein the embossed base film has an embossed pattern that is stable at a temperature of at least 80° C.

3. An embossed multilayer film according to claim 2 wherein the embossed pattern is stable at a temperature of at least 90° C.

4. An embossed multilayer film according to claim 3 wherein the embossed pattern is stable at a temperature of at least 120° C.

5. An embossed multilayer film according to claim 1 wherein the embossed base layer has a first embossed pattern and a second embossed pattern different from the first embossed pattern.

6. An embossed multilayer film according to claim 1 wherein the base layer has a softening temperature greater than 90° C.

7. An embossed multilayer film according to claim 6 wherein the base layer has a softening temperature greater than 120° C.

8. An embossed multilayer film according to claim 1 wherein the base layer is an ionomer of ethylene/acrylic acid copolymer with a metal cation or an ionomer of ethylene/methacrylic acid copolymer with a metal cation.

9. An embossed multilayer film according to claim 8 wherein the metal cation is a zinc cation.

10. An embossed multilayer film according to claim 1 wherein the base layer is a rubber modified ethylene-propylene copolymer.

11. An embossed multilayer film according to claim 1 wherein the protective surface layer has a thickness that does not vary by more than about 20%.

12. An embossed multilayer film according to claim 1 wherein the protective surface layer renders the embossed multilayer film weatherable.

13. An embossed multilayer film according to claim 1 wherein the protective surface layer renders the embossed multilayer film resistant to chemical exposure.

14. An embossed multilayer film according to claim 1 wherein the protective surface layer provides the embossed multilayer film with interior surface protection properties.

15. An embossed multilayer film according to claim 1 wherein the protective surface layer is uncrosslinked.

16. An embossed multilayer film according to claim 1 wherein the protective surface layer is crosslinked.

17. An embossed multilayer film according to claim 1 wherein the protective surface layer is a polyurethane-based material.

18. An embossed multilayer film according to claim 17 wherein the polyurethane-based material comprises the reaction product of an aliphatic diisocyanate and either a polyester polyol, a polycarbonate polyol, a polyacrylic polyol or blends thereof.

19. An embossed multilayer film according to claim 17 wherein the polyurethane-based material is blended with either an acrylic material or an epoxy material.

20. An embossed multilayer film according to claim 1 further comprising at least one color layer beneath the protective surface layer.

21. An embossed multilayer film according to claim 1 further comprising an adhesive layer for bonding the multilayer embossed film to a surface.

22. An embossed multilayer film according to claim 1 wherein the surface layer has a substantially uniform thickness that does not vary by more than about 15%.

23. An embossed multilayer film comprising:
   (a) an embossed base layer selected from the group consisting of rubber modified ethylene-propylene copolymers and acid based ionomers; and
   (b) a conformable, polyurethane-based surface layer that has a substantially uniform thickness that does not vary by more than about 20% and which overlies the base layer.

24. An embossed multilayer film according to claim 23 wherein the protective surface layer renders the embossed multilayer film weatherable.

25. An embossed multilayer film according to claim 23 wherein the protective surface layer renders the embossed multilayer film resistant to chemical exposure.

26. An embossed multilayer film according to claim 23 wherein the protective surface layer provides the embossed multilayer film with interior surface protection properties.

27. An embossed multilayer film according to claim 23 wherein the polyurethane-based material comprises the reaction product of an aliphatic diisocyanate and either a polyester polyol, a polycarbonate polyol, a polyacrylic polyol or blends thereof.

28. An embossed multilayer film according to claim 23 wherein the polyurethane based material is blended with either an acrylic material or an epoxy material.

29. An embossed multilayer film according to claim 23 wherein the embossed pattern is stable at a temperature of at least 90° C.

30. An embossed multilayer film according to claim 23 further comprising at least one color layer beneath the protective surface layer.

31. An embossed multilayer film according to claim 23 wherein the surface layer has a substantially uniform thickness that does not vary by more than about 15%.

32. An embossed multilayer film according to claim 23 wherein the acid based ionomer is an ionomer of ethylene/acrylic acid copolymer with a metal cation or an ionomer of ethylene/methacrylic acid copolymer with a metal cation.

33. An embossed multilayer film according to claim 32 wherein the metal cation is a zinc cation.

* * * * *

UNITED STATES PATENT AND TRADEMARK OFFICE
CERTIFICATE OF CORRECTION

PATENT NO.: 5,405,675

DATED: April 11, 1995

INVENTOR(S): Raymond M. SAWKA, Carl W. MCMULLEN, Chia-Tie HOT and Stefan WEIGL

It is certified that error appears in the above-identified patent and that said Letters Patent is hereby corrected as shown below:

Column 2, line 54, "C. so that" should read --C., so that--
Column 3, line 18, "comprise" should be inserted before "an 80%/20%".
Column 4, line 35, "90° C." should read --90° C.,--
Column 5, line 30, "base:" should read --base--
Column 8, line 22, "below" should be inserted before "base layer 12"
Column 11, line 66, "except." should read --except--
Column 15, line 11, "croselinking" should read --crosslinking--

Signed and Sealed this

Ninth Day of July, 1996

BRUCE LEHMAN

Attest:

Attesting Officer

Commissioner of Patents and Trademarks